April 13, 1948. R. B. DOME 2,439,651
ATTENUATION CONTROL NETWORK
Filed Aug. 9, 1943
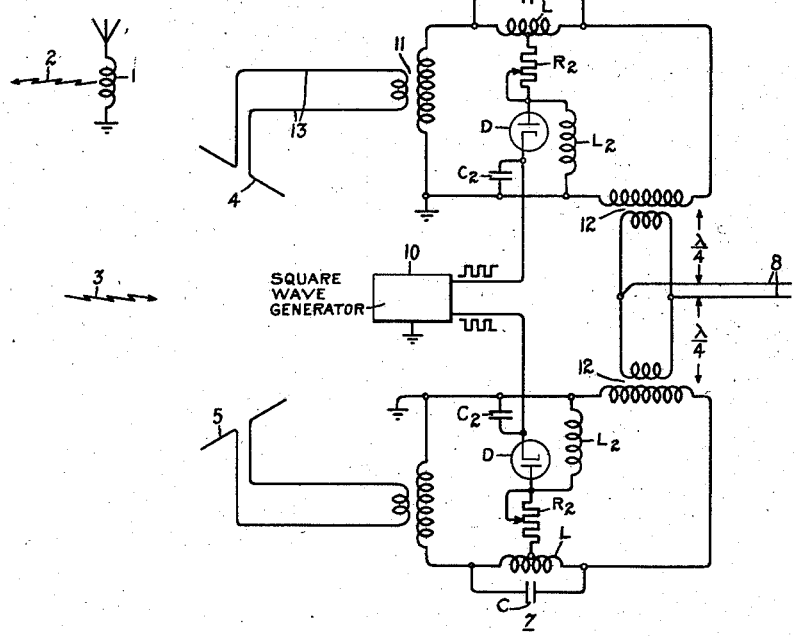
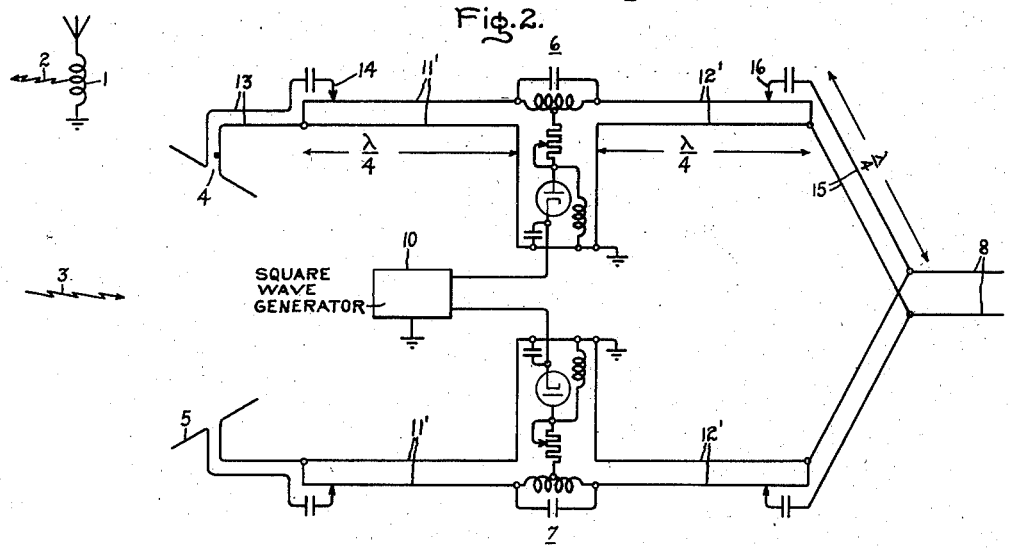
Inventor:
Robert B. Dome,
by Harry E. Dunham
His Attorney.

Patented Apr. 13, 1948

2,439,651

UNITED STATES PATENT OFFICE 2,439,651

ATTENUATION CONTROL NETWORK

Robert B. Dome, Bridgeport, Conn., assignor to General Electric Company, a corporation of New York Application August 9, 1943, Serial No. 497,918

4 Claims. (Cl. 178—44)

My invention relates to attenuation control networks for use in high frequency circuits, and it has for one of its objects to provide certain improvements in such networks in which the attenuation may be varied over an extremely wide range in response to variation of a desired control voltage.

In short wave radio systems, such as are now commonly employed for determining the direction of remote objects from which radio waves are reflected, for example, commonly two or more receiving antennae are employed. These antennae may be positioned one above the other as when altitude is to be determined, or they may be differently oriented in azimuth or elevation, and reception may be had alternately therefrom thereby to determine the direction of the remote object from which waves are received. Means are employed between each antenna and the common receiver to alternate the reception between the two antennae.

An object of my invention is to provide improved means for effecting such alternation of the reception from the two antennae.

Another object of my invention is to provide an improved attenuation network which may be employed in the circuits leading to such antennae the attenuation of which may readily be varied between extremely wide limits under control of a suitable control voltage.

A further object of my invention is to provide improved means including such networks so arranged that reception from one antenna is not impaired by operation of the opposite network to interrupt reception from the other antenna.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an embodiment of my invention, and Fig. 2 represents a modification thereof.

Referring to Fig. 1 of the drawing, I have represented at 1 a radiating antenna adapted to transmit short radio waves in regularly recurring pulses which may traverse remote space and be reflected from a remote object such, for example, as an airplane. This radiated wave is indicated at 2 and the reflected wave at 3. This reflected wave may be received on two differently oriented antennae 4 and 5 both of which are connected through respective channels 6 and 7 to a common receiver, which may be connected to the conductors 8.

Each of the channels 6 and 7 includes a network comprising the elements C, L, $R_2$, D, $C_2$ and $L_2$ arranged to attenuate currents received on the respective antenna during reception from the opposite antenna. The elements C and L comprise respectively a capacitance and inductance connected in parallel and resonant at the frequency of waves to be received, this combination being in series with one side of each of the channels 6 and 7. The midpoint of the inductance L is connected through a variable resistance $R_2$, a diode D and a capacitance $C_2$ to the opposite side of the channel which may be grounded, the diode D and capacity $C_2$ being shunted by an inductance $L_2$. Capacity $C_2$ may be of large value such that it has substantially zero impedance at the frequency to be transmitted; and the inductance $L_2$ resonates with the capacity of the diode at the frequency to be transmitted through the channel when the diode is non-conducting.

At 10 is represented a source of square wave voltage connected to impress a square wave upon the cathode of each of the two diodes D, these voltages being of opposite polarity; that is, the cathode of the diode D in channel 6 is rendered positive when the cathode of the diode D in channel 7 is rendered negative both with respect to ground. In this way each diode is rendered conductive when the other diode is non-conductive. Oscillations from the antennae are supplied to these networks by means of transformers 11 and currents supplied through the network are transmitted through a second transformer 12 to the channel 8 and the receiver connected thereto.

The network comprising the parallel combination of the inductance L and capacity C with the branch circuit comprising the elements $R_2$, $L_2$, D and $C_2$, the resistance of which branch may be designated $R_1$, produces attenuation in the respective channel 6, 7, dependent upon the value of the resistance $R_1$ of this shunt branch. This attenuation may readily be varied over an extremely wide range by variation of the resistance $R_1$ of this branch, as by rendering diode D conducting or non-conducting.

The elements L and C resonate at the frequency to be transmitted through the channel and similarly the inductance $L_2$ resonates at the same frequency with the capacity in shunt with it including the capacity of diode D, when non-conducting, in series with the capacity $C_2$, which may be very large.

It can readily be shown that infinite attenuation exists in the channel between transformers 11 and 12 when the following relation applies:

$$R_1 = \frac{\omega^2 L^2}{4R} \quad (1)$$

where $R_1$ is the resistance between the midpoint of inductance L and ground and $$\omega = \frac{1}{\sqrt{LC}} = 2\pi f \quad (2)$$

where $f$ is the frequency to be transmitted and R is the resistance of the coil L.

As is well known the resistance between the terminals of a shunt tuned circuit, such as L and C, is expressed by the relation:

$$R_0 = \frac{L}{CR} \quad (3)$$

where $R_0$ is the impedance of the tuned circuit due to coil resistance. From these relations it follows that $$R_1 = \frac{L}{4CR} \quad (4)$$

or $$R_1 = \frac{R_0}{4} \quad (5)$$

Thus, to produce infinite attenuation between transformers 11 and 12 the resistance $R_1$ between the midpoint of coil L and ground when the diode is conducting should be about one-quarter of the shunt impedance of the tuned circuit LC at resonance.

Diode D when conducting may have a resistance of from 150 to 300 ohms dependent upon the particular diode employed and the variable resistance $R_2$ may have a maximum value of, for example, 500 ohms. By variation of resistance $R_2$ the total resistance $R_1$ between the midpoint of inductance L and ground may be adjusted to the required value. For example, if the resistance $R_0$ of the tuned circuit LC be 2000 ohms, as may readily be the case when inductance L is a coil wound of small sized wire or of high resistance wire, then the resistance $R_1$ may be adjusted to 500 ohms by variation of the resistance $R_2$. Thus, infinite attenuation may be had between the two transformers 11 and 12 when the diode D is conducting.

When diode D is non-conducting, as during the portion of the square wave from generator 10 when the cathode of the diode is positive with respect to the anode, then the resistance $R_1$ is the sum of the resistance $R_2$ and the shunt resistance $R_3$ of the tuned circuit comprising the inductance $L_2$ and the capacity of the diode in series with the condenser $C_2$. This resistance $R_3$ has the value $$R_3 = \frac{\omega^2 L_2^2}{R_4} = \omega L_2 Q \quad (6)$$

where $R_4$ is the resistance of coil $L_2$ and $$Q = \frac{\omega L_2}{R_4}$$

For example, if the frequency to be transmitted through the channel be 200 megacycles, $\omega L_2$ may be 200 ohms and Q may be 100 giving $R_3$ a value of 20,000 ohms, which is much greater than the 500 ohm value when the diode is conducting.

Thus, when the diode is non-conducting, efficient transfer of energy takes place between the transformers 11 and 12. The loss due to the circuit LC, the resistance of which has been referred to as 2000 ohms, may be only ten percent where the line between antenna 4 and transformer 11 and that between transformer 12 and the circuit 8 are 20,000 ohm lines and the transformers are designed to match these 20,000 ohm lines to the impedance of the network LC.

The lines extending from transformers 12 to circuit 8 should each have a length equal to a quarter of a wave length of the wave to be transmitted. In this way each channel 6 and 7 is prevented from producing a low impedance across the opposite channel when its respective diode is conducting. That is, the low impedance of the network including the diode, when the diode is conducting, is stepped up or transformed to a high value across the circuit 8 by the action of the intermediate line having a length equal to a quarter of the wave length of the wave to be transmitted.

Fig. 2 shows a modification of my invention in which the transformers 11 and 12 of Fig. 1 are replaced by additional quarter wave length sections of transmission line 11', 12'. The line 13 extending from the antenna 4 is connected between the end of the line 11' and a tap 14 thereon to effect the desired impedance and voltage transformation. Similarly the line 15 extending from the circuit 8 is connected between the end of the quarter wave section 12' and a point along the length thereof, as indicated at 16, to effect desired impedance and voltage transformation. Of course, these points are selected to secure desired impedance matching when the diode is non-conducting.

While I have shown particular embodiments of my invention, it will, of course, be understood that I do not wish to be limited thereto since different modifications may be made both in the circuit arrangement and in the instrumentalities employed, and I contemplate by the appended claims to cover any such modifications as fall within the true spirit and scope of my invention.

What I claim as new and desire to secure by Letters Patent of the United States is:

1. In combination, a high frequency transmission channel, a parallel combination of inductance and capacity connected in series with said channel and resonant at the frequency of waves to be transmitted therethrough, a source of variable voltage, means to interrupt transmission of waves of said frequency through said channel in accord with said voltage, said means comprising an impedance connected between the midpoint of said inductance and the opposite side of said circuit, and means to vary said impedance in accord with said voltage.

2. In combination, a high frequency transmission channel, a parallel combination of inductance and capacity connected in series with one side of said channel and resonant at the frequency of waves to be transmitted therethrough, a unilateral conducting device connected between the midpoint of said inductance and the opposite side of said channel and having resistance in the conducting direction of such value as to produce high attenuation through said combination in said channel, a source of variable control voltage, and means to bias said unilateral conducting device to be non-conducting in accord with said control voltage thereby to reduce said attenuation.

3. In combination, a high frequency transmission channel, a parallel combination of inductance and capacity connected in series with one side of said channel and resonant at the frequency of waves to be transmitted therethrough, a diode connected between the midpoint of said inductance and the opposite side of said channel, means to supply control voltage to said diode to render it conducting or non-conducting dependent upon the polarity of said voltage, and an inductance in shunt with said diode resonant with the capacitance of said diode at said frequency when said diode is non-conducting whereby high attenuation is produced in said channel at said frequency when said diode is conducting and low attenuation is produced when said diode is non-conducting.

4. In combination, a pair of signal channels, means to render said channels alternately operative, said means comprising a parallel combination of inductance and capacity connected in series with one side of each channel, a pair of diodes, one for each channel, each diode being connected between the midpoint of said inductance in the respective channel and the opposite side of said channel, and means to supply similar square waves to said diodes in opposite phase thereby to render either diode conducting when the opposite diode is non-conducting, the impedance of each diode when conducting being small relative to the shunt impedance of the respective parallel combination of inductance and capacity.

ROBERT B. DOME.

REFERENCES CITED

The following references are of record in the file of this patent:

UNITED STATES PATENTS

| Number | Name | Date |
|---|---|---|
| 2,093,665 | Tellegen | Sept. 21, 1937 |